US 6,529,320 B2

(12) United States Patent
Gregory et al.

(10) Patent No.: US 6,529,320 B2
(45) Date of Patent: Mar. 4, 2003

(54) C AND L BAND LAMINATED FABRIC OPTICAL AMPLIFIER

(75) Inventors: Bryan Gregory, Glen Ellyn, IL (US); Randy Wickman, Cadott, WI (US)

(73) Assignee: Corona Optical Systems, Inc., DE (US)

( * ) Notice: Subject to any disclaimer, the term of this patent is extended or adjusted under 35 U.S.C. 154(b) by 0 days.

(21) Appl. No.: 09/910,567

(22) Filed: Jul. 20, 2001

(65) Prior Publication Data
US 2002/0033999 A1 Mar. 21, 2002

Related U.S. Application Data
(60) Provisional application No. 60/234,282, filed on Sep. 21, 2000.

(51) Int. Cl.⁷ .................................................. H01S 3/00
(52) U.S. Cl. .................................... 359/349; 359/333
(58) Field of Search .............................. 359/349, 341.1, 359/333

(56) References Cited
U.S. PATENT DOCUMENTS

| | | | | |
|---|---|---|---|---|
| 6,049,418 A | * | 4/2000 | Srivastava et al. | 359/341 |
| 6,104,527 A | * | 8/2000 | Yang | 359/341 |
| 6,215,585 B1 | * | 4/2001 | Yoshimura et al. | 359/344 |
| 6,307,668 B1 | * | 10/2001 | Bastien et al. | 359/337.1 |

* cited by examiner

*Primary Examiner*—Mark Hellner
(74) *Attorney, Agent, or Firm*—Welsh & Katz, Ltd.

(57) ABSTRACT

A method and apparatus are provided for amplifying a first optical signal having a first wavelength and a second optical signal having a second wavelength. The method includes the steps of routing the first and second optical signal into a first and second optical amplifier coupled in parallel and amplifying the first optical signal at the first wavelength in the first optical amplifier and the second optical signal at the second wavelength in the second optical amplifier.

22 Claims, 4 Drawing Sheets

C AND L BAND LAMINATED FABRIC OPTICAL AMPLIFIER

CROSS REFERENCE TO RELATED APPLICATIONS

This application claims the benefit of U.S. Provisional Application No. 60/234,282, filed Sep. 21, 2000.

FIELD OF THE INVENTION

The field of the invention relates to signal process systems and more particularly to optical communications links used for backplane communication.

BACKGROUND OF THE INVENTION

Signal processing systems are generally known. Typically, such systems (e.g., Carrier class routers, which direct internet protocol traffic; Enterprise switches, which manage corporate Ethernet-traffic; Dense Wavelength Division Multiplexing transmission equipment, which transmits telephony and data-traffic over optical fibers) are designed for some particular signal processing, switching or routing goal. Often such systems are designed by first defining a set of inputs and outputs. Inputs and outputs may be categorized according to processing requirements. Often some inputs/outputs have special processing requirements (e.g., IP encoded internet traffic, SONET telephony signals, ATM data signals, Virtual Private Networks).

To achieve overall processing goals, a number of different signal processing engines must be integrated into the overall system design. Often the individual processing engines are specified as discrete devices to take advantage of commercially available processing boards.

While such commercially available devices are effective, they often have input/output requirements which can overwhelm most electrical domain backplane communication systems. Optical domain backplane transmission systems are often the only practical alternative. However, as signal distribution becomes more complicated and large numbers of optical domain elements are placed in the optical signal path to allow processing, signal attenuation often limits topologies and possible functions. Accordingly, a need exists for a communication system backplane which is capable of operating in the optical domain and which is capable of a wide range of signal distribution scenarios.

SUMMARY

A method and apparatus are provided for amplifying a first optical signal having a first wavelength and a second optical signal having a second wavelength. The method includes the steps of routing the first and second optical signal into a first and second optical amplifier coupled in parallel and amplifying the first optical signal at the first wavelength in the first optical amplifier and the second optical signal at the second wavelength in the second optical amplifier.

DETAILED DESCRIPTION OF A PREFERRED EMBODIMENT

Figure 1:
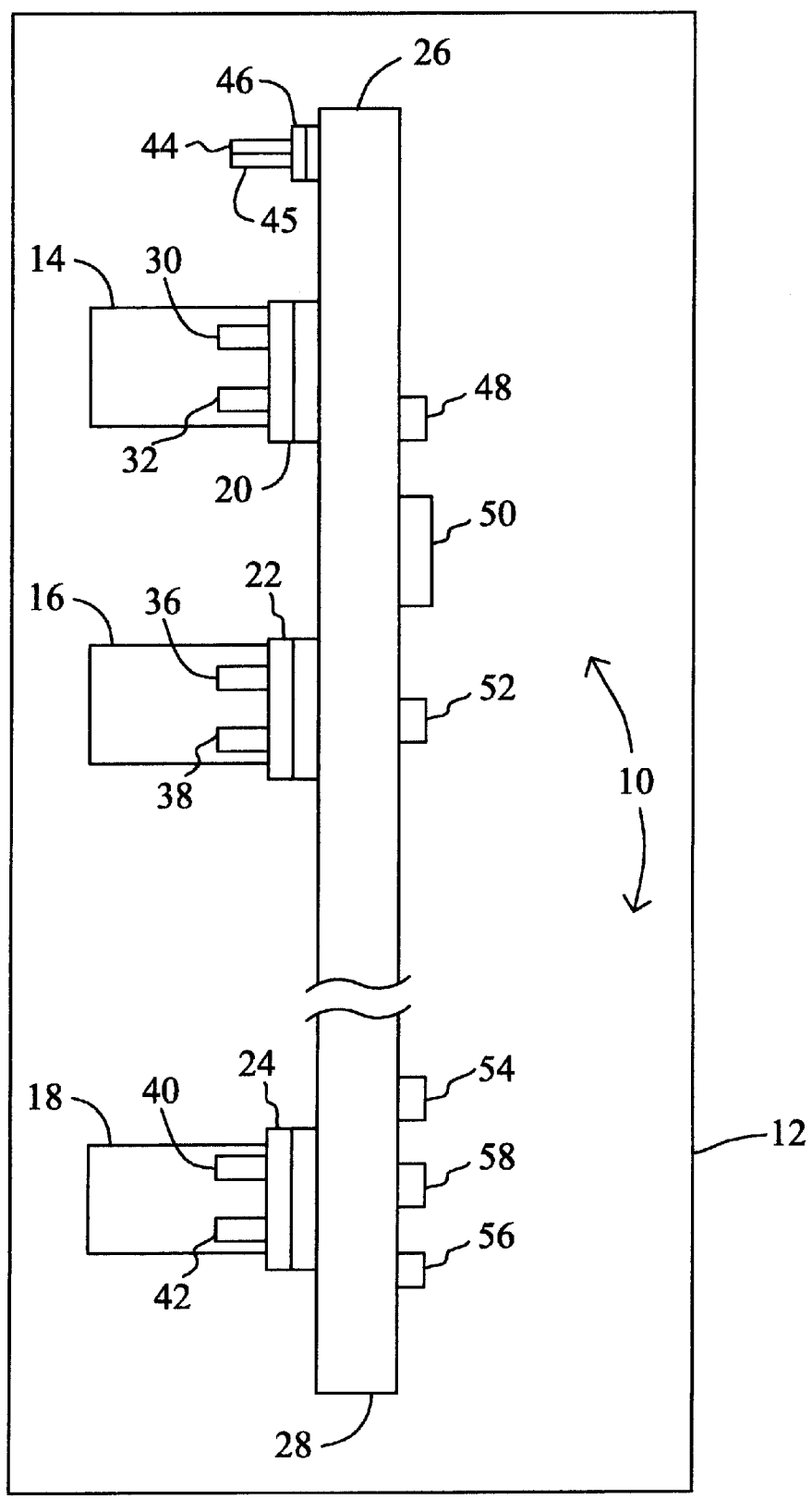
FIG. 1 is a block diagram of backplane optical amplifiers shown in a context of use under an illustrated embodiment of the invention.

FIG. 1 depicts a number of backplane optical amplifier systems 10, shown generally in a context of use and in accordance with an illustrated embodiment of the invention. As shown, the backplane optical amplifier systems 10 may be used within the context of a signal processing system 12 (where reference number 12 may designate either a single system enclosure or a number of relatively closely spaced cabinets of a signal processing system).

Included within the signal processing system 12 may be a number of signal processing boards 14, 16, 18. The signal processing boards 14, 16, 18 may be regarded as sources and destinations of information signals processed by the system 12.

Under the illustrated embodiment, information may be processed within a signal processing unit (such as a switch, router or traffic management chip) of each signal processing board 14, 16, 18. Once processed, streams of information signals may need to be transferred among signal processing boards 14, 16, 18 in a relatively rapid manner.

To facilitate the rapid transfer of information signals among signal processing boards 14, 16, 18, a set of electro-optic converters 30, 32; 36, 38; 40, 42 may be provided on each signal processing board 14, 16, 18. One element-of each set (e.g., 30, 36, 40) may be an information signal transmitter (e.g., a distributed feedback laser (DFB)) and a second element (e.g., 32, 38, 42) may be an information signal receiver (e.g., a photodiode).

The electro-optic converters 30, 32; 36, 38; 40, 42 in combination with one or more backplane optical amplifier systems 10 provide a dense, reliable means of amplifying optical domain signals as they are transferred among boards 14, 16, 18. This eliminates the need for placing optical amplifiers on the signal processing boards 14, 16, 18 of the system 12, hence providing more board space for other optical and electrical elements. It allows optical domain processing of the signal without concern for optical attenuation. It also allows relatively weak Dense Wavelength Division Multiplexed (DWDM) optical signals to be amplified prior to long distance transmission.

Figure 2:
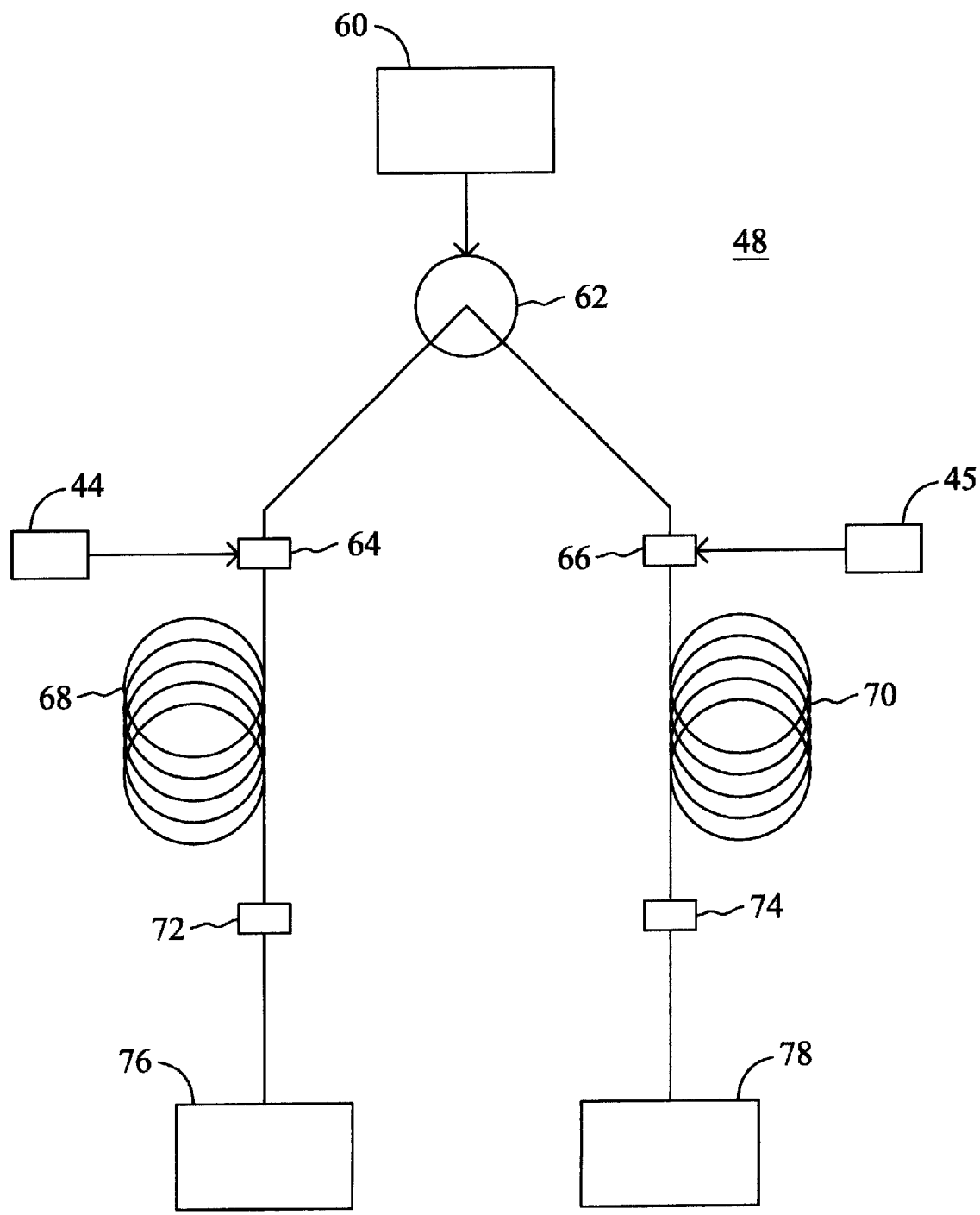
FIG. 2 is a simplified block diagram of an backplane optical amplifier of FIG. 1.

Turning now to the backplane 26, 28 in specific, FIG. 2 is a simplified block diagram of one example 48 of the backplane optical amplifier systems 10 shown in FIG. 1. The system 48 of FIG. 2 may form a networking element such as an optical cross-connect, terabit router, metropolitan dense wavelength division multiplexing system, or part of a distributed backplane system in which it is desirable to interconnect optical signals among various components of a single system. It should be understood, that the optical amplifier system 48 of FIG. 2 may be one of many optical amplifier systems 50, 52, 54, 56 present within the processing system 12.

Included within the system 48 may be pump lasers 44, 45 a splitter 62, multiplexers 64, 66, optically amplifying waveguides 68, 70 and demultiplexers 72, 74. The pump lasers 44, 45 may be any coherent optical source capable of providing a coherent signal at a pumping frequency (e.g., 980 nm, 1480 nm, etc.). Pump lasers 44, 45 may be obtained from any of a number of suppliers (e.g., SDL, Uniphase, etc.).

The splitter 62 may be a fused fiber unit obtained from any of a number of suppliers (e.g., Uniphase, Corning, etc.). Similarly, the multiplexers 64, 66 may be any device (e.g., a fused biconic optical multiplexer, a reflective interference filter, wavelength division multiplexer, etc.) capable of combining the pumping energy from the pump laser 44, 45 with an information signal 60.

The amplifying waveguides 68, 70 may be an optical waveguide doped with a rare earth element (e.g., erbium, ytterbium, neodymium, prezoidium, erbium-ytterbium, etc.) or some other non-rare earth elements (e.g., fluoride etc.) and optimized for the wavelength in which it is used. For example, the first amplifying waveguide 68 may be an erbium doped fiber optimized for the "C-band" wavelength (i.e., 1530–1562 nanometers (nm)) from any of a number of suppliers (e.g., Lucent, Corning, etc.). Similarly, the second amplifying waveguide 70 may be an erbium doped fiber optimized for the "L-band" window (i.e., 1570–1605 nm) from any of a number of suppliers (e.g., Lucent, Corning, etc.).

The demultiplexers 72, 74 may be any optical filter device capable of passing an amplified optical information signal within the respective optical bandwidth and eliminating the pump signal from the output data fiber. Numerous optical devices are known which may be used in this regard (e.g., a fiber Bragg grating, a fused biconic demultiplexer, etc.).

The system 48 of FIG. 2 is exemplary of a one-way communications path between any two or more signal processing boards 14, 16, 18 of the system 12. More specifically, the input signal 60 of FIG. 2 may be provided by any one of the optical transmitters 30, 36, 40 of FIG. 1 and the amplified output 76, 78 may be provided to any one of the optical detectors 32, 38, 42 shown in FIG. 1.

In the case of WDM the system 48 may be used for signal routing. For example, the input 60 may include a signal in the C-band and a signal in the L-band. The system 48 of FIG. 2 may be used to separate and route each signal to a respective destination.

As would be understood by those of skill in the art, the pump lasers 44, 45 operate at a pumping wavelength which is different than the wavelength of the information signal (i.e., the C-band and L-band components of the input signal 60). The pump lasers 44, 45 provide pumping energy into the amplifying waveguides 68, 70 through multiplexers 64, 66. The pumping energy provided by the pump lasers 44, 45 is absorbed by the rare earth doping atoms (e.g., erbium) of the respective waveguides 68, 70, raising the atoms to a higher energy state. In the absence of an information signal arriving at an optical input connection 60, the atoms remain in an elevated energy state. The demultiplexers (or Bragg gratings) 72, 74 prevents pumping energy from exiting the optical amplifier system 48 as output signals 76, 78. The net result of the application of a combined C-band and L-band information signal as an input 60 is that the C-band signal is provided as an output 76 of the C-band side of the optical amplifier system 48 and an L-band signal is provided as an output 78 on the L-band side of the optical amplifier system 48.

Upon the occurrence of a C-band or an L-band or a combined C-band and L-band information signal on the signal input 60, the atoms of the respective amplifying waveguides 68, 70 emit energy at their respective wavelengths. By selecting characteristics (e.g. doping materials, waveguide structure, waveguide length etc.) of the amplifying waveguides 68, 70 to resonate at selected wavelengths of respective information signals (and not at the wavelength of the pumping signals or a different information signal) the net result is amplification of an information signal arriving at the signal input 60 and leaving through the respective outputs 76, 78 using a process referred to as stimulated emission.

The demultiplexers 72, 74 are chosen to pass energy at the wavelength of the respective information signal and reflect or absorb energy at the pumping wavelength. The result is that an attenuated information signal arriving at the signal input 60 is passed to the signal outputs 76, 78 as an amplified and separated C-band and L-band information signal of a much higher energy level.

The use of the backplane amplifying system 10 allows for the use of very low-power laser diodes (e.g., distributed feedback diode (DFB) lasers, tunable VCSEL lasers, etc.) on the signal processing boards 14, 16, 18, thereby saving valuable board space. The backplane amplifying system 10 also allows at least some of the signal processing boards (e.g., 18) to be placed on a separate backplane 28 at some distance from a first backplane 26 without loss of signal quality. In the case of a second backplane 28, a second optical amplifying system 10 (of a similar nature to the described optical amplifying system 48), may be required for the two-way exchange of information signals.

The splitter 62, multiplexers 64, 66, amplifying waveguides 68, 70 and demultiplexers 72, 74 may be secured to the backplane by any appropriate manner (e.g., screws, glue, etc.). Alternatively, the splitter 62, multiplexers 64, 66, amplifying waveguides 68, 70 and demultiplexers 72, 74 may be embedded within a material of the backplane 26, 28 to form a structural part of the backplane 26, 28. Undoped optical fibers may also be embedded in the backplane 26 to couple the respective elements of the backplane optical amplifier systems 10.

In contrast, the pump lasers 44, 45 may be located on a separate circuit board accessible from a front of the backplane 26. The pump lasers 44, 45 may be coupled to the backplane 26 through the use of a blindmate connector 46. The signal processing boards 14, 16, 18 may also be connected to the backplane 26, 28 using blindmate connectors 20, 22, 24. As used herein a blindmate connector is a device which provides alignment of optical fibers during board insertion using a progressive alignment system of guide pins.

The splitter 62, multiplexers 64, 66, amplifying waveguides 68, 70 and demultiplexers 72, 74 are rugged devices that are not subject to maintenance or frequent failure. Locating these elements 62, 64, 66, 68, 70, 72, 74 in the backplane 26, 28 results in a significant reduction in system space requirements. Conversely, locating one or more pump lasers 44, 45 on one or more circuit boards allows the elements, which could fail, to be replaced in a convenient, easy manner.

Figure 3:
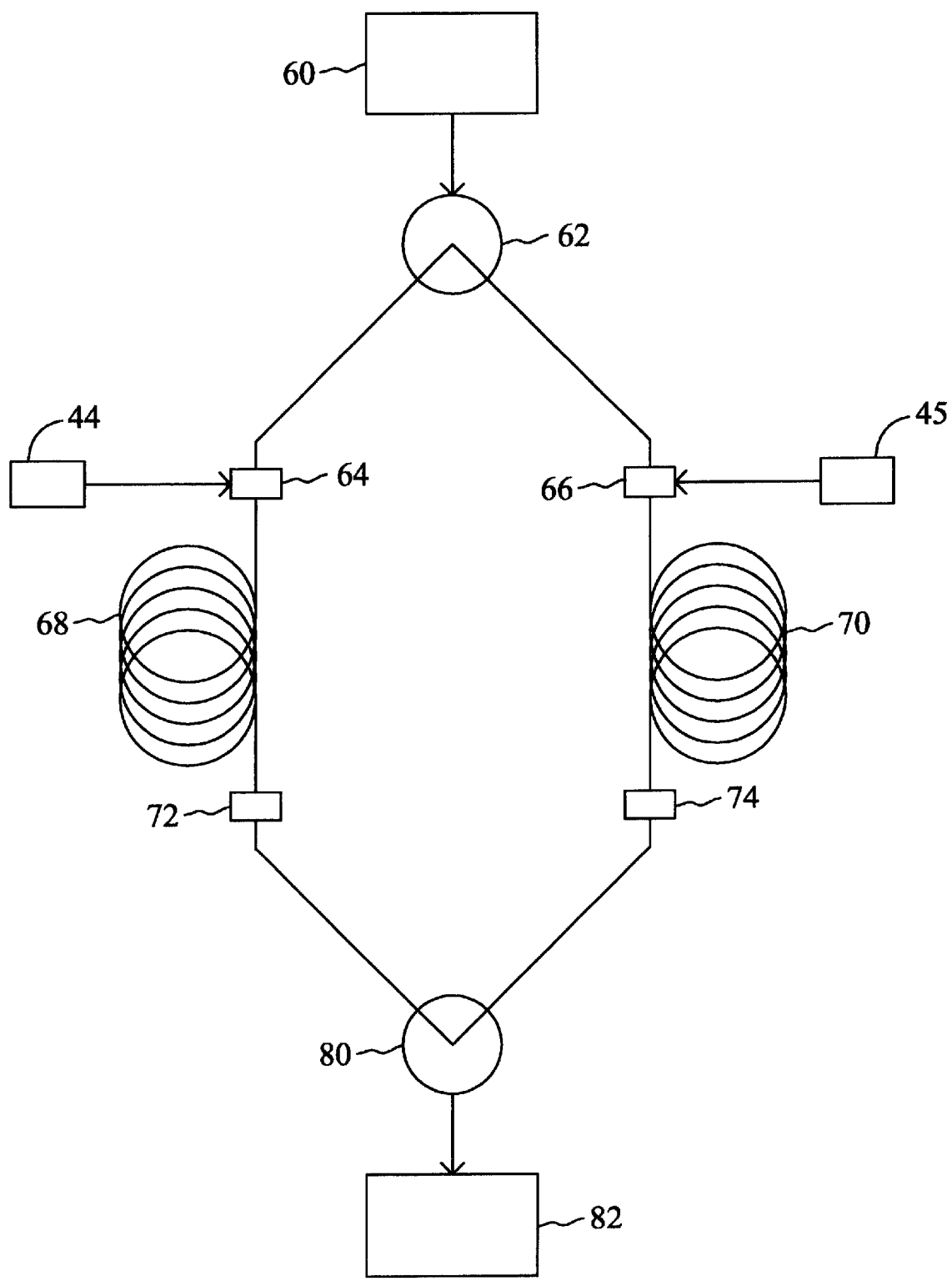
FIG. 3 is a simplified block diagram of the backplane optical amplifier of FIG. 1 under an alternate embodiment.

Under another illustrated embodiment of the invention (FIG. 3), an optical amplifier system 50 (of the systems 10) may be provided with a combiner 80. The combiner 80 may be used to combine C and L-band signals. The use of the combiner 80 allows the same optical amplifier 50 to amplify combined signals in both the C and L-bands.

Figure 4:
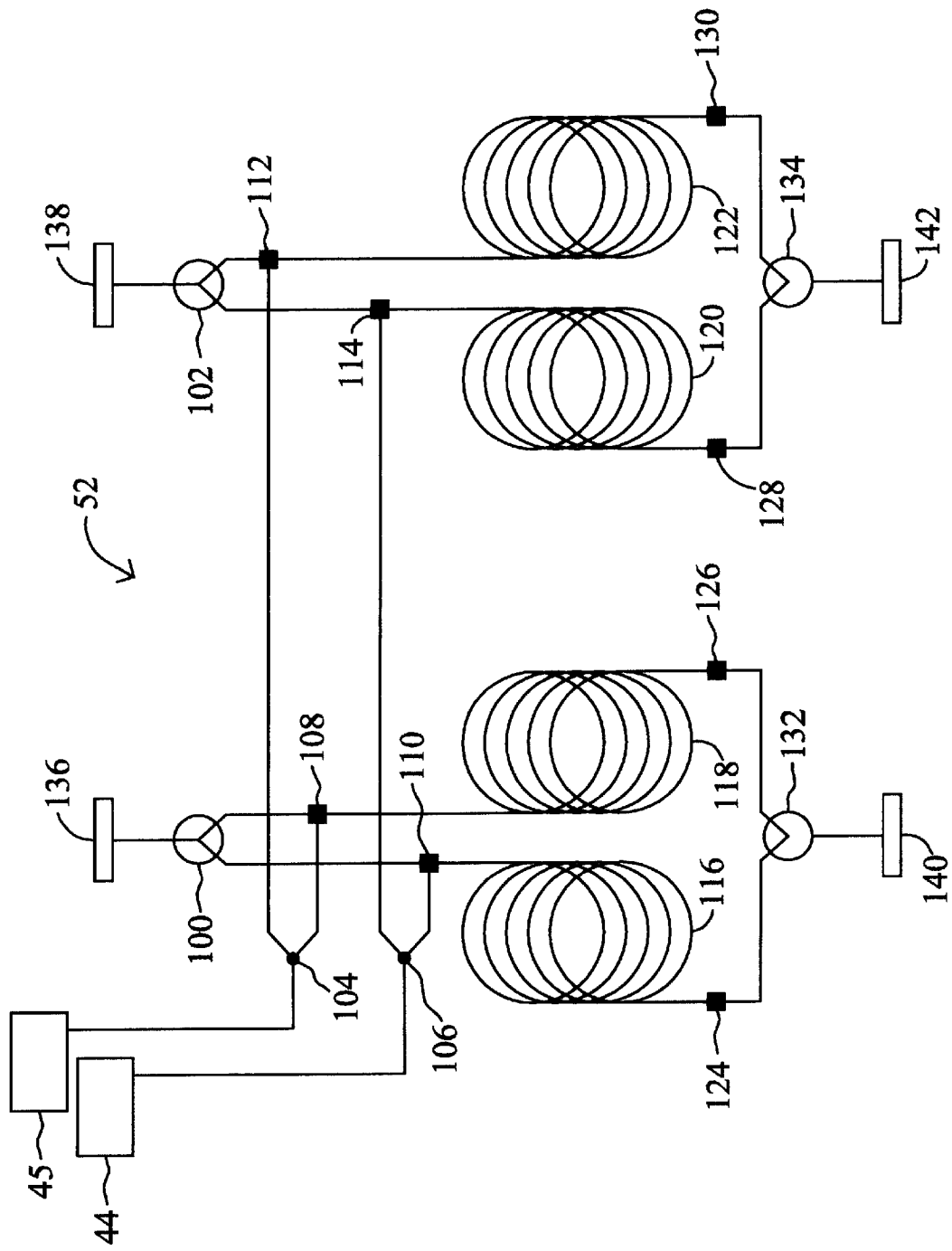
FIG. 4 is a simplified block diagram of the backplane optical amplifier of FIG. 1 under a further alternative embodiment.

Under another embodiment (FIG. 4), a set of splitters 104, 106 are provided to allow the pump lasers 44, 45 to amplify information signals flowing through multiple waveguides. As above, a first information signal 136 is split in a first splitter 100 and combined with a pumping signal in multiplexers 108, 110. The components of the first information signal may be amplified in their respective amplifying waveguides 116, 118. The amplified components of the first signal 136 may pass through demultiplexers 124, 126, be combined in combiner 132 and be provided as an output signal 140.

Similarly, a second information signal 138 is split in a first splitter 102 and combined with a pumping signal in multiplexers 112, 114. The components of the second information signal may be amplified in their respective amplifying waveguides 120, 122. The amplified components of the first signal 138 may pass through demultiplexers 128, 130, be combined in combiner 134 and be provided as an output signal 142.

A specific embodiment of a method and apparatus for amplifying an optical information signal according to the present invention has been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention and any and all modifications, variations, or equivalents that fall within the true spirit and scope of the basic underlying principles disclosed and claimed herein.

What is claimed is:

1. A method of amplifying a first optical signal having a first wavelength and a second optical signal having a second wavelength in a signal processing system having a plurality of signal processing boards disposed on a backplane, such method comprising the steps of:

disposing a first and second optical amplifier on the backplane;

routing the first and second optical signals from a first signal processing board of the plurality of signal processing boards into the first and second optical amplifiers disposed on the backplane, said first and second optical amplifiers being coupled in parallel;

amplifying the first optical signal at the first wavelength in the first optical amplifier and the second optical signal at the second wavelength in the second optical amplifier; and routing at least one of the amplified first and second optical signals from the backplane to a second signal processing board of the plurality of signal processing boards.

2. The method of amplifying the first and second optical signals as in claim 1 further comprising combining the amplified first and second optical signals.

3. The method of amplifying the first and second optical signals as in claim 1 further comprising pumping the first and second amplifiers with a first and a second pumping signal, respectively.

4. The method of amplifying the first and second optical signals as in claim 1 further comprising filtering the pumping signal from an output of the first and second amplifiers, respectively.

5. The method of amplifying the first and second optical signals as in claim 1 further comprising splitting the first and second optical signals before application to the first and second amplifiers.

6. The method of amplifying the first and second optical signals as in claim 1 further comprising fabricating the first optical amplifier to amplify in a C wavelength band.

7. The method of amplifying the first and second optical signals as in claim 1 further comprising fabricating the first optical amplifier to amplify in an L wavelength band.

8. An apparatus for amplifying a first optical signal having a first wavelength and a second optical signal having a second wavelength in a signal processing system having a plurality of signal processing boards disposed on a backplane, such apparatus comprising:

a first and second optical amplifier disposed on the backplane;

means for routing the first and second optical signals from a first signal processing board of the plurality of signal processing boards into the first and second optical amplifiers disposed on the backplane, said first and second optical amplifiers being coupled in parallel;

means for amplifying the first optical signal at the first wavelength in the first optical amplifier and the second optical signal at the second wavelength in the second optical amplifier; and means for routing at least one of the amplified first and second optical signals from the backplane to a second signal processing board of the plurality of signal processing boards.

9. The apparatus for amplifying the first and second optical signals as in claim 8 further comprising means for combining the amplified first and second optical signals.

10. The apparatus for amplifying the first and second optical signals as in claim 8 further comprising means for pumping the first and second amplifiers with a first and a second pumping signal, respectively.

11. The apparatus for amplifying the first and second optical signals as in claim 8 further comprising means for filtering the pumping signal from an output of the first and second amplifiers, respectively.

12. The apparatus for amplifying the first and second optical signals as in claim 8 further comprising means for splitting the first and second optical signals before application to the first and second amplifiers.

13. The apparatus for amplifying the first and second optical signals as in claim 8 further comprising means for amplifying in a C wavelength band within the first optical amplifier.

14. The apparatus for amplifying the first and second optical signals as in claim 8 further comprising means for amplifying in an L wavelength band within the second optical amplifier.

15. An apparatus for amplifying a first optical signal having a first wavelength and a second optical signal having a second wavelength in a signal processing system having a plurality of signal processing boards disposed on a backplane, such apparatus comprising:

the backplane;

a first optical amplifier disposed on the backplane;

a second optical amplifier disposed on the backplane and coupled in parallel with the first optical amplifier;

a splitter adapted to route the first and second optical signal from a signal processing board of the plurality of signal processing boards into the first and second optical amplifier;

a first pumping signal adapted to amplify the first optical signal at the first wavelength in the first optical amplifier;

a second pumping signal adapted to amplify the second optical signal at the second wavelength in the second optical amplifier; and a waveguide adapted to route one of the amplified first and second optical signals to a second signal processor of the plurality of signal processors.

16. The apparatus for amplifying the first and second optical signals as in claim 15 further comprising a combiner adapted to combine the amplified first and second optical signals.

17. The apparatus for amplifying the first and second optical signals as in claim 15 further comprising a first pumping laser adapted to pump the first amplifier with the first pumping signal.

18. The apparatus for amplifying the first and second optical signals as in claim 15 further comprising a second pumping laser adapted to pump the second amplifier with the second pumping signal.

19. The apparatus for amplifying the first and second optical signals as in claim 15 further comprising a demultiplexer adapted to filter the first and second pumping signal from an output of the first and second amplifiers, respectively.

20. The apparatus for amplifying the first and second optical signals as in claim 15 further comprising means for splitting the first and second optical signals before application to the first and second amplifiers.

21. A method of amplifying a plurality of optical signals in a signal processing system having a plurality of signal processing boards disposed on a backplane comprising the steps of:

disposing a first optical amplifier and second optical amplifier on the backplane;

coupling the first optical amplifier amplifying an optical signal in a first frequency range between a signal source on a first signal processing board of the plurality of signal processing boards and a signal destination on a second signal processing board of the plurality of signal processing boards; and coupling the second optical amplifier amplifying an optical signal in a second frequency range different from the first frequency range in parallel with the first optical amplifier between the signal source on the first signal processing board and a signal destination.

22. A method of amplifying a plurality of optical signals in a signal processing system having a plurality of signal processing boards disposed on a backplane comprising the steps of:

disposing a first optical amplifier and second optical amplifier on the backplane;

coupling the first optical amplifier amplifying an optical signal of the plurality of optical signals in a first frequency range between a signal source on a first signal processing board of the plurality of signal processing boards and a signal destination on a second signal processing board of the plurality of signal processing boards; and coupling the second optical amplifier amplifying an optical signal in a second frequency range different from the first frequency range in parallel with the first optical amplifier on a second signal processing board of the plurality of signal processing boards between the signal source and a signal destination.

* * * * *